United States Patent Office 3,479,226
Patented Nov. 18, 1969

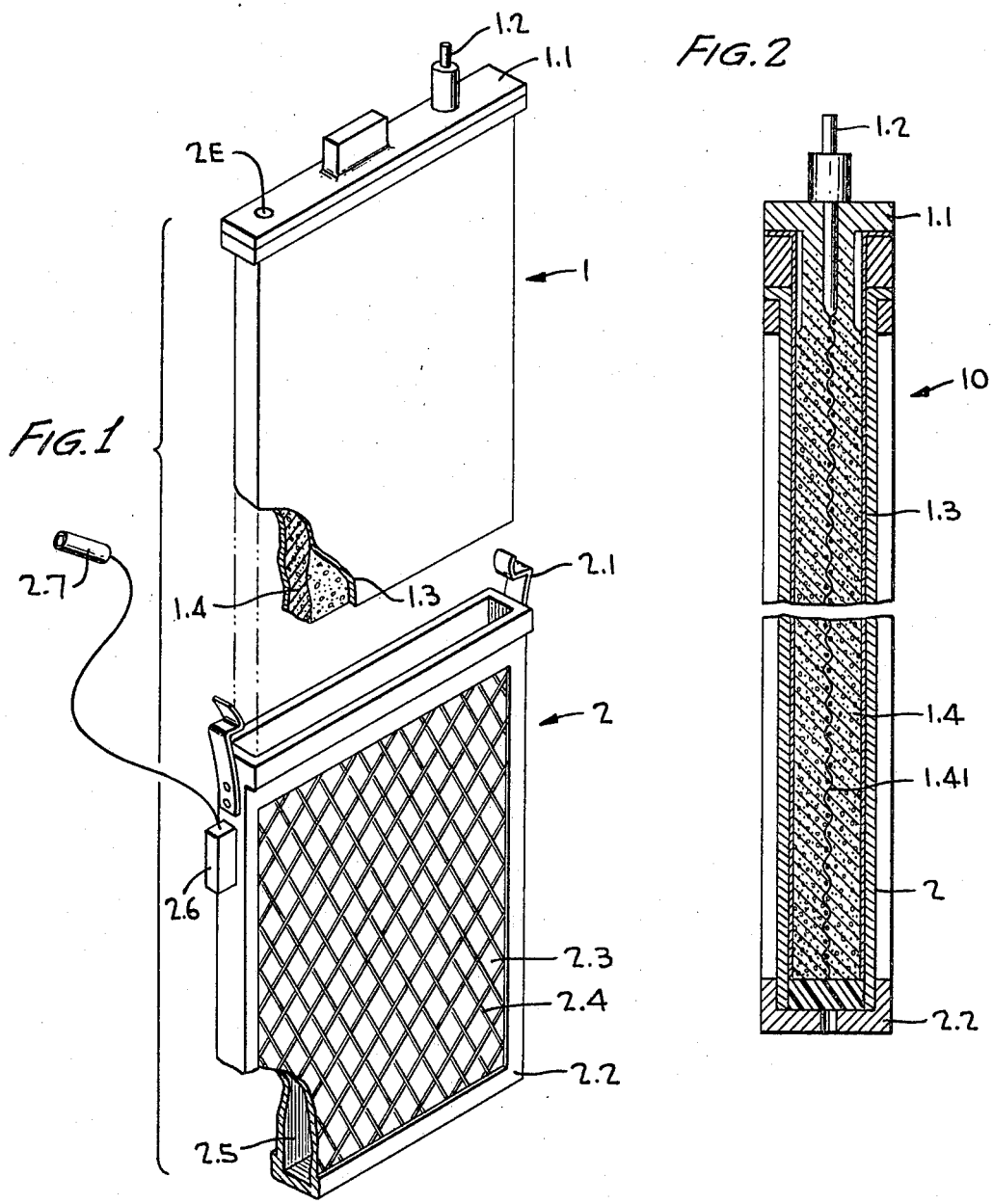

3,479,226
METHOD OF CHEMICALLY REGENERATING AIR DEPOLARIZED CELL WITH HYDROGEN
Harry G. Oswin, Chauncey, N.Y., assignor to Leesona Corporation, Warwick, R.I., a corporation of Massachusetts
Filed July 22, 1966, Ser. No. 567,264
Int. Cl. H01m 27/04
U.S. Cl. 136—86                               9 Claims This invention relates to an improved air or oxygen cell. More particularly, the invention embraces an air or oxygen cell which is conveniently recharged chemically and to the aforesaid method of recharging. The cell comprises a non-consumable air or oxygen depolarized cathode and a consumable anode preferably comprising a material more electronegative than hydrogen. The invention provides a means for recharging an air battery by contacting the air or oxygen depolarized cathode with hydrogen.

Air or oxygen depolarized cells of the type where only the anode of the cell is chemically changed during operation are known. The early cells of this type were made up of non-consumable air- or oxygen-permeable carbon cathodes in combination with a consumable anode such as zinc. Such cells are practical where slow discharge is to take place. However, as a result of the low efficiency of the carbon electrodes, they are not suitable where rapid discharge is necessary. More recently the metal/oxygen or metal/air systems as described in my copending application Ser. No. 427,623, now abandoned, have become increasingly attractive particularly from the standpoint of obtaining a high energy to density ratio and rapid discharge. The ability to obtain the high discharge rates is primarily a result of the novel and highly efficient cathodes which comprise a hydrophobic, gas-permeable, liquid-impermeable membrane in contact with a uniformly distributed catalytic layer of metal and preferably a hydrophobic polymer intimately admixed with the metal. In operation, the hydrophobic membrane is in contact with air or oxygen and the catalytic layer is in contact with an electrolyte which is present between the cathode and consumable anode.

The primary shortcoming of air batteries, including those employing the aforesaid cathodes, is that they are normally not easily and conveniently recharged. An external DC power source is necessary and care must be taken to avoid having the oxygen generated during the recharge cycle build-up within the cell and cause damage. Normally, therefore, the recharge must be fairly slow. Moreover, there is usually a loss of minor amounts of water from the electrolyte during each cycle necessitating the addition of water. Furthermore, voltage input during the charging of the cell is normally much greater than the maximum voltage output during the reverse phase of the cycle. For example, in a zinc/oxygen cell, during the discharge half of the total dischárge/charge cycle, the voltage output is about 1.2 volts, whereas the voltage input during charge is about 2.1 volts. This is due to inherent inefficiencies of the electrochemical processes.

It has now been discovered that by using elements more electronegative than hydrogen as the anode, the cell can be charged by merely contacting the positive electrode with hydrogen and connecting it to the negative metal/metal oxide couple. Accordingly, it is an object of the present invention to provide an air or oxygen depolarized cell which can be recharged chemically.

It is a further object of this invention to reduce the amount of heat dissipated during charging by replacing the oxygen-evolving anode with a hydrogen-depolarized anode which has a greater efficiency, permitting a higher rate of charging.

It is another object of this invention to provide a method of recharging an air or oxygen depolarized cell which does not require a power generator.

It is another object of this invention to provide a method of recharging an air or oxygen depolarized cell which is not restricted by the rate of formation and dissipation of oxygen bubbles at the cathode.

It is another object of this invention to provide a method of recharging an air or oxygen depolarized cell which is extremely rapid with the rate of recharge being limited only by the rate of reduction of the metal oxide to metal.

It is another object of this invention to provide a method of regenerating an air or oxygen depolarized cell wherein water is reformed in the electrolyte of the cell to replace and maintain the total water inventory in the cell constant during numerous cycles.

These and other objects of the invention will become more fully apparent from the following detailed description, with emphasis being placed on the drawing and working embodiment.

The present invention is directed to a secondary cell which can be chemically regenerated. Accordingly, no power generator is required. The cell comprises a metal/air cell (as used herein, metal/air and air include metal/oxygen and oxygen). The cathode of the cell comprises a gas-permeable, liquid-impermeable hydrophobic polymer film having a matrix or layer of catalyst uniformly applied to one surface. The catalyst must be capable of both reducing oxygen and oxidizing hydrogen. The anode preferably is a metal more electronegative in a given electrolyte than hydrogen. However, as will be more fully apparent hereinafter, metal/air cells having anodes more electropositive than hydrogen can be employed and recharged according to the present invention, but with fewer over-all advantages. The anode and cathode are separated by a suitable acid or alkaline electrolyte.

When the metal/air cell is in a charged, i.e., predominantly metallic condition, it can be completely or partially discharged by exposure of the cathode to air and the application of a load. Although the cell can be recharged by normal charging procedures (i.e., reversing polarity), according to the present invention the cell is regenerated by electrically connecting the cathode of the cell, i.e., the porous gas diffusion electrode, to the anode, i.e., the consumable metal electrode, and sweeping the porous diffusion cathode with hydrogen. In the event the metal of the anode is more noble or electronegative than hydrogen, the net result is the anodic oxidation of hydrogen at the porous diffusion electrode and the cathodic reduction of metal oxide to metal at the negative plate. Since the metal employed is more electronegative than hydrogen, a net gain in potential can be obtained.

More specifically, in operation of such a cell, air passes through the polymer membrane, ionizes at the catalytic layer, accepting electrons, and forming hydroxyl ions which are transferred to the metal anode to complete the electrochemical reaction. A representative discharge cycle where cadmium is employed as the anode, with the current flow being from the cadmium anode through a suitable load to the non-consumable cathode is as follows:

At the cathode:

$$O_2 + 2H_2O \rightarrow 4OH^-$$

At the anode:

$$Cd + 2OH^- \rightarrow Cd(OH)_2 + 2e$$

Total cell reaction:

$$Cd + \tfrac{1}{2}O_2 + H_2O \rightarrow Cd(OH)_2$$

Upon recharge, the cathode, i.e., the porous diffusion electrode, is connected directly to the cadmium anode and the porous diffusion electrode is swept with hydrogen. The reaction is as follows:

At the cathode:

$$H_2 + 2OH^- \rightarrow 2HOH + 2e$$

At the anode:

$$Cd(OH)_2 + 2e \rightarrow Cd + 2OH^-$$

Total cell reaction:

$$Cd(OH)_2 + H_2 \rightarrow Cd + 2HOH$$

The aforesaid reaction mechanism applies to any metal which is more electronegative than hydrogen, there being no need to apply an external current. However, in the event the metal of the metal/air cell is more electropositive than hydrogen, as in the case of zinc, it is necessary to employ an external voltage, i.e., about 0.41 volt, to impart sufficient electrical energy to balance the system. Thereafter, the cathode is swept with hydrogen. The latter part of the reaction will proceed exactly as indicated hereinabove. As is apparent, where the metal is more electropositive than hydrogen, many of the advantages of the over-all system are not realized, i.e., an external generator is needed. However, heat dissipation is minimized and oxygen bubbling eliminated. Moreover, a substantially lower amount of energy input is required and, further, the water loss from the cell is at least partially replenished. Therefore, a practical and desirable system is still obtained. According to this invention, it is desirable, although not completely necessary, to eliminate access of oxygen or air to the cathode and short out the cell to use up all available or residual oxygen in the cell before sweeping the porous diffusion electrode with hydrogen. This avoids any possibility of oxygen reacting with hydrogen at, or within the diffusion electrode.

The construction of the cell of the present invention will be more readily apparent from the accompanying drawing, wherein like numerals are employed to designate like parts and wherein:

FIGURE 1 is an exploded perspective view of one embodiment of the improved cell with the anode and cathode being partly broken away; and FIGURE 2 is the cell of FIGURE 1 in cross section showing the anode and cathode in operable association.

More specifically, referring to the drawing, reference numeral 10 is directed to the complete cell comprising anode 1 and a bi-cathode 2. The bi-cathode comprises a frame 2.2, a hydrophobic membrane 2.3, a conductive support screen 2.4 which is on the internal side of the membrane, but in view of the thinness of the membrane the configuration of the screen is apparent from the outer surface of the membrane, and a catalytic layer 2.5. The anode of the cell 1 fits into the bi-cathode 2 and comprises a top portion 1.1 and a porous sinter or sheet metal plate 1.4. In the embodiment shown in the drawing, the anode is held in place in the bi-cathode by clip 2.1. The anode can comprise a screen 1.41 to improve the strength and conductivity of the anode. Preferably, a glassine paper or the like 1.3 completely covers the anode and electrically insulates the anode from the bi-cathode. If the anode is porous, sufficient electrolyte is added to the cell through port 2E to fill the pores and impregnate separator 1.3. In the event a sheet metal anode is selected, the electrolyte is added to the pocket of the bi-cathode and allowed to saturate separator 1.3 after the anode is in place, or the separator 1.3 is saturated with electrolyte prior to insertion of the anode. Anode lead 1.2 is connected to an adjacent cathode lead 2.6 by means of socket 2.7. As apparent, various modifications can be made in the actual design.

The cathode (in the embodiment shown, a bi-cathode) as more fully described in the aforesaid co-pending Oswin application Ser. No. 427,623 and as set forth hereinbefore, comprises a hydrophobic polymer membrane which is in contact with a conductive metal support screen or mesh and a catalytic layer. The polymer which is to be used can be any polymeric material which is hydrophobic and permits the passage of gas, but precludes the flow of aqueous materials. Exemplary polymers are the fluorinated hydrocarbons such as polytetrafluoroethylene, polytrifluorochloroethylene, polyvinylfluoride, polyvinylidenefluoride, polytrifluoroethylene, the hydrophobic co-polymers of two or more of the above materials or co-polymers of such materials with acrylonitrile, methacrylate, polyethylene, and the like. The polymers normally will have a porosity of from about 15 to 85 percent and a uniform pore size distribution of from about 0.01 to about 100 microns, and a thickness of about 0.5 to 10 mils. The catalyst used to coat the hydrophobic polymers are the pure elements, alloys, oxides or mixtures thereof which are effective in promoting the reduction of oxygen as well as the oxidation of hydrogen. Operable materials include the elements, alloys, oxides, or mixtures of Groups I-B, II-B, IV, V, VI, VII, and VIII metals of the Mendelyeev's Periodic Table. The metal support screen can be any material which conducts an electrical current and which will withstand the corrosive environment of the cell. Such materials include nickel, zirconium, titanium and tungsten screens, expanded meshes or the like. Moreover, it is possible to apply a hydrophilic polymer or other suitable hydrophilic material, such as paper, over the catalytic layer which will be in contact with the electrolyte of the battery when in operation. Furthermore, in order to obtain a greater voltage from a given battery, it can be desirable to insert an insulating material in the bi-cathode to, in effect, provide two distinct cathodes. By connecting the cathodes of the cells in series, it is possible to obtain an increased voltage. Such cathodes, as the term is used herein, are still considered to be bi-cathodes. As will be apparent, if the cathode is separated by an insulating material, the anodes as well must be separated to form two distinct anodes, or one anode for each cathode.

The anodes which are to be used herein preferably are metals, metalloids, alloys, and the like, which are more electronegative than hydrogen in a given electrolyte. Moreover, it is essential that the material selected be chemically reactive with a compatible electrolyte and be more electropositive than oxygen. In the event an alkaline electrolyte is employed, elements which are more electronegative than hydrogen including cadmium, copper, nickel, cobalt, lead, and bismuth can be used. In the event an acid electrolyte is employed, elements which are more electronegative than hydrogen including copper, silver, and antimony can be used.

Although the anode will preferably comprise a material more electronegative than hydrogen, a practical and desirable cell can be obtained using metals which are electropositive with respect to hydrogen. However, as noted hereinbefore, if such metals are employed, it is necessary to apply a suitable voltage to the cell during recharge to balance the over-all system. The following sets forth preferred anode materials which can be used in alkaline or acid cells with an indication of the external voltage which must be applied to balance the system.

TABLE I.—ALKALINE ELECTROLYTES

| Metals: | External voltages applied, volts |
|---|---|
| Zinc | 0.41 |
| Iron | 0.05 |
| Tin | 0.08 |
| Na/Hg | 1.0 |

TABLE II.—ACID ELECTROLYTES

| Metals: | External voltages applied, volts |
|---|---|
| Lead | 0.126 |
| Tin | 0.136 |

The minimum external voltage which is to be applied represents the difference between the E° values for the $M/M^{x+}$ couple and the $H_2/H^+$ couple. In view of the over-all considerations, such as favorable position in the electromotive series, relative abundance, and the like, cadmium is preferred as the anode metal.

As noted hereinbefore, the metal/air cells will operate with conventional electrolytes including the alkaline materials such as sodium hydroxide, potassium hydroxide, mixtures of potassium and rubidium hydroxide and the like. Acid electrolytes including sulfuric acid, phosphoric acid, and hydrochloric acid can be employed. Further, as stated above, depending upon the particular electrolyte used, different anode materials will be selected. It is feasible and usually desirable to employ an electrolyte which is trapped in a suitable matrix such as those made up of hydrophilic polymers, ceramic materials such as cerium oxide, thorium oxide, magnesium oxide, and the like. Additionally foamed glass or rigid hydrophilic foams can be selected.

Having described the invention in general terms, the following examples are set forth with reference to the drawing to more particularly illustrate the invention. However, they are not meant to be limiting.

Example I

An air battery substantially as shown in FIGURES 1 and 2 was constructed comprising a cadmium anode, a composite cathode composed of a polytetrafluoroethylene membrane coated on one surface with a uniform dispersion of platinum black intermixed with particles of polytetrafluoroethylene and a 30 percent potassium hydroxide electrolyte. The polytetrafluoroethylene membrane had a thickness of 7 mils. The catalytic layer having a thickness of 2 mils was applied to the polymer membrane by rolling an aqueous paste of platinum black and polytetrafluoroethylene particles onto the membrane and removing the water by mild heating. An expanded nickel mesh was pressed into the catalytic surface to improve the electrical conductivity of the cathode. The cell when operated at ambient temperatures provided an open circuit voltage of 1.0 volt and had a coulombic capacity of 10 amp hours at a three-hour rate.

After being completely discharged, the cathode is flushed with nitrogen to remove any oxygen and thereafter a stream of hydrogen was passed to the cathode at a pressure of about 0.5 p.s.i.g. The cell was completely recharged in a period of two hours without using an external power source. The cell, when subjected to a series of discharge and charge cycles, gave no indication of deterioration.

Example II

A composite cell is constructed substantially as described in Example I except that the anode is porous zinc. The cell, when operated at ambient temperatures, will provide an open circuit voltage of 1.46 volts and has a coulombic capacity of 25 amp hours at a three-hour rate.

After being 30 percent discharged, the cell was recharged by connecting a DC power source to the lead connecting the anode to the cathode. A voltage of 0.5 volt is applied. Thereafter, the cathode is swept with an inert nitrogen stream and then fed with a stream of hydrogen at 10 p.s.i.g. In 2½ hours the cell is completely recharged. The cell, when subjected to a series of discharge and charge cycles, gave no indication of deterioration after four complete cycles.

In the aforesaid working embodiments, only a single cell is employed. However, it is obvious that a plurality of cells can be stacked in a suitable housing. For an indication of the construction of a cell stack, reference is made to Rosansky co-pending application Ser. No. 517,604 filed Dec. 30, 1965. In such a battery of cells, means are provided in the battery construction for closing off the air vents which permit access of air or oxygen to the cathodes and for totally removing the remaining oxygen in the gas space by short-circuiting the cell. Hydrogen is then introduced from a hydrogen source through manifold means or the like. Numerous modifications to the aforesaid embodiments are thus possible.

In the above examples, the catalytic layer can be replaced by other materials which are electrochemically active with respect to both oxygen and hydrogen. Such materials include rhodium, palladium, ruthenium, osmium, iridium, and alloys thereof, as for example alloys containing gold and silver. Additionally, the polymer can be replaced by other materials which are hydrophobic in nature and allow the passage of gas but preclude the passage of liquids. The anodes can be replaced by other materials as exemplified hereinbefore.

It should be appreciated that the instant invention is not to be construed as being limited by the illustrative examples. It is possible to produce still other embodiments without departing from the inventive concept herein disclosed. Such embodiments are within the ability of one skilled in the art.

It is claimed:

1. A method of chemically recharging a metal/air battery during off-load comprising a consumable metal anode, a composite cathode, said anode and cathode being spaced apart and electronically separated from each other and defining an electrolyte chamber therebetween, and an electrolyte in said electrolyte chamber, said composite cathode comprising an air permeable and electrolyte impermeable hydrophobic surface having a layer of electrochemically active catalyst thereon which is active with respect to oxidation of hydrogen and reduction of oxygen comprising the steps of (1) electrically connecting the composite cathode of the cell to the consumable anode; and (2) sweeping the cathode with hydrogen.

2. The method of claim 1 wherein the consumable anode is more electronegative in the electrolyte employed than hydrogen.

3. The method of claim 1 wherein the anode is more electropositive in the electrolyte employed than hydrogen.

4. The method of claim 3 wherein an external voltage is applied to the cell to balance the electrical energy of the system.

5. The method of claim 2 wherein the anode is composed of cadmium.

6. The method according to claim 1 wherein the catalyst of the composite cathode comprises a metal of Group VIII of the Mendelyeev's Periodic Table.

7. The method according to claim 1 wherein the Group VIII metal is in black form and is intimately admixed with a finely divided hydrophobic material.

8. A method according to claim 7 wherein the hydrophobic material is a fluorocarbon.

9. A method according to claim 8 wherein the anode is cadmium.

References Cited

UNITED STATES PATENTS

| | | | |
|---|---|---|---|
| 1,190,879 | 7/1916 | Emanuel | 136—164.1 |
| 3,207,682 | 9/1965 | Oswin et al. | 136—86 X |
| 3,311,508 | 3/1967 | Biddick et al. | 136—86 X |
| 3,316,125 | 4/1967 | Makrides | 136—164 X |

ALLEN B. CURTIS, Primary Examiner

U.S. Cl. X.R.

136—164